United States Patent
Smoilovski

(10) Patent No.: US 10,635,578 B1
(45) Date of Patent: Apr. 28, 2020

(54) SYSTEM, METHOD, AND COMPUTER PROGRAM FOR PERIODIC MEMORY LEAK DETECTION

(71) Applicant: Amdocs Development Limited, Limassol (CY)

(72) Inventor: Ilan Inna Smoilovski, Kiryat-Ono (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 194 days.

(21) Appl. No.: 15/809,834

(22) Filed: Nov. 10, 2017

(51) Int. Cl.
*G06F 11/00* (2006.01)
*G06F 11/36* (2006.01)
*G06F 11/07* (2006.01)

(52) U.S. Cl.
CPC ...... *G06F 11/3692* (2013.01); *G06F 11/0718* (2013.01); *G06F 11/3612* (2013.01); *G06F 11/073* (2013.01)

(58) Field of Classification Search
CPC .......................... G06F 11/3612; G06F 11/3692
See application file for complete search history.

(56) References Cited

U.S. PATENT DOCUMENTS

| | | | |
|---|---|---|---|
| 5,737,609 A | 4/1998 | Reed et al. | |
| 5,953,530 A | 9/1999 | Rishi et al. | |
| 8,473,893 B2 | 6/2013 | Poole et al. | |
| 8,504,996 B2 * | 8/2013 | Zagatta | G06F 11/3668 711/154 |
| 9,064,048 B2 * | 6/2015 | Macik | G06F 11/3612 |
| 2003/0056200 A1 * | 3/2003 | Li | G06F 11/323 717/128 |
| 2008/0172679 A1 | 7/2008 | Shen et al. | |
| 2013/0091337 A1 * | 4/2013 | Schmich | G06F 11/3636 711/171 |
| 2017/0336984 A1 * | 11/2017 | Nicol | G06F 3/0608 |

FOREIGN PATENT DOCUMENTS

CN 101110044 A 1/2008

OTHER PUBLICATIONS

Valgrind, "Current Releases," Jun. 28, 2017, pp. 1-2, as retrieved by the Internet Archive Wayback Machine, https://web.archive.org/web/20170628161942/http://www.valgrind.org/downloads/current.html.

Valgrind, "Using and understanding the Valgrind core," Jul. 1, 2017, pp. 1-22, as retrieved by the Internet Archive Wayback Machine, https://web.archive.org/web/20170601102255/http://www.valgrind.org/docs/manual/manual-core.html.

(Continued)

*Primary Examiner* — Michael Maskulinski
(74) *Attorney, Agent, or Firm* — Zilka-Kotab, P.C.

(57) ABSTRACT

A system, method, and computer program product are provided for periodic memory leak detection. In operation, a system monitors one or more processes that perform dynamic memory allocations. The system receives a data type indicator indicating a type of data associated with the dynamic memory allocations to collect. The system receives a time indicator indicating a time period for monitoring and collecting data associated with the data type indicator. The system collects the data associated with the data type indicator for the one or more processes for the time period. Moreover, the system generates a report based on the collected data associated with the data type indicator for the one or more processes.

9 Claims, 5 Drawing Sheets

(56) References Cited

OTHER PUBLICATIONS

IBM, "How Purify finds and reports memory leaks," 2001, pp. 1-3, as retrieved from ftp://ftp.software.ibm.com/software/rational/docs/v2003/purify/html/ht_how_p_finds_leaks.htm.

IBM, "IBM Rational PurifyPlus," Rational Software, 2007, pp. 1-4, as retrieved from ftp://public.dhe.ibm.com/software/rational/web/datasheets/version6/pplus.pdf.

Micro Focus, "DevPartner Studio Professional Edition 11.03," 2015, pp. 1-4, as retrieved from http://www.borland.com/Borland/media/Resources/Data%20sheets/BDS-DevPartner-Studio-Pro-Ed_11-3.pdf?ext=.pdf.

Micro Focus, "DevPartner Overview," 2018, pp. 1-6, as retrieved from https://www.microfocus.com/products/devpartner/.

Component Source, "DevPartner for Visual C++ BoundsChecker Suite, Named Users," Nov. 16, 2017, pp. 1-3, as retrieved from https://www.componentsource.com/product/devpartner-visual-c-boundschecker-suite-visual-studio-named-users/reviews.

\* cited by examiner

SYSTEM, METHOD, AND COMPUTER PROGRAM FOR PERIODIC MEMORY LEAK DETECTION

FIELD OF THE INVENTION

The present invention relates to memory leak detection, and more particularly to a system for periodic memory leak detection, in which the periods may be variable and a different type of data may be collected in each period.

BACKGROUND

Memory leaks in performance-critical, highly-available applications in a production or production-like environment, may result in slow response times or in an outage of the application, and are notoriously difficult to detect and fix. In some scenarios or environments, it is impossible to use any of the existing memory leak detection tools, due to the limitations and/or side-effects of the tool.

There is thus a need for addressing these and/or other issues associated with the prior art.

SUMMARY

A system, method, and computer program product are provided for periodic memory leak detection. In operation, a system monitors one or more processes that perform dynamic memory allocations. The system receives a data type indicator indicating a type of data associated with the dynamic memory allocations to collect. The system receives a time indicator indicating a time period for monitoring and collecting data associated with the data type indicator. The system collects the data associated with the data type indicator for the one or more processes for the time period. Moreover, the system generates a report based on the collected data associated with the data type indicator for the one or more processes.

DETAILED DESCRIPTION

Figure 1:
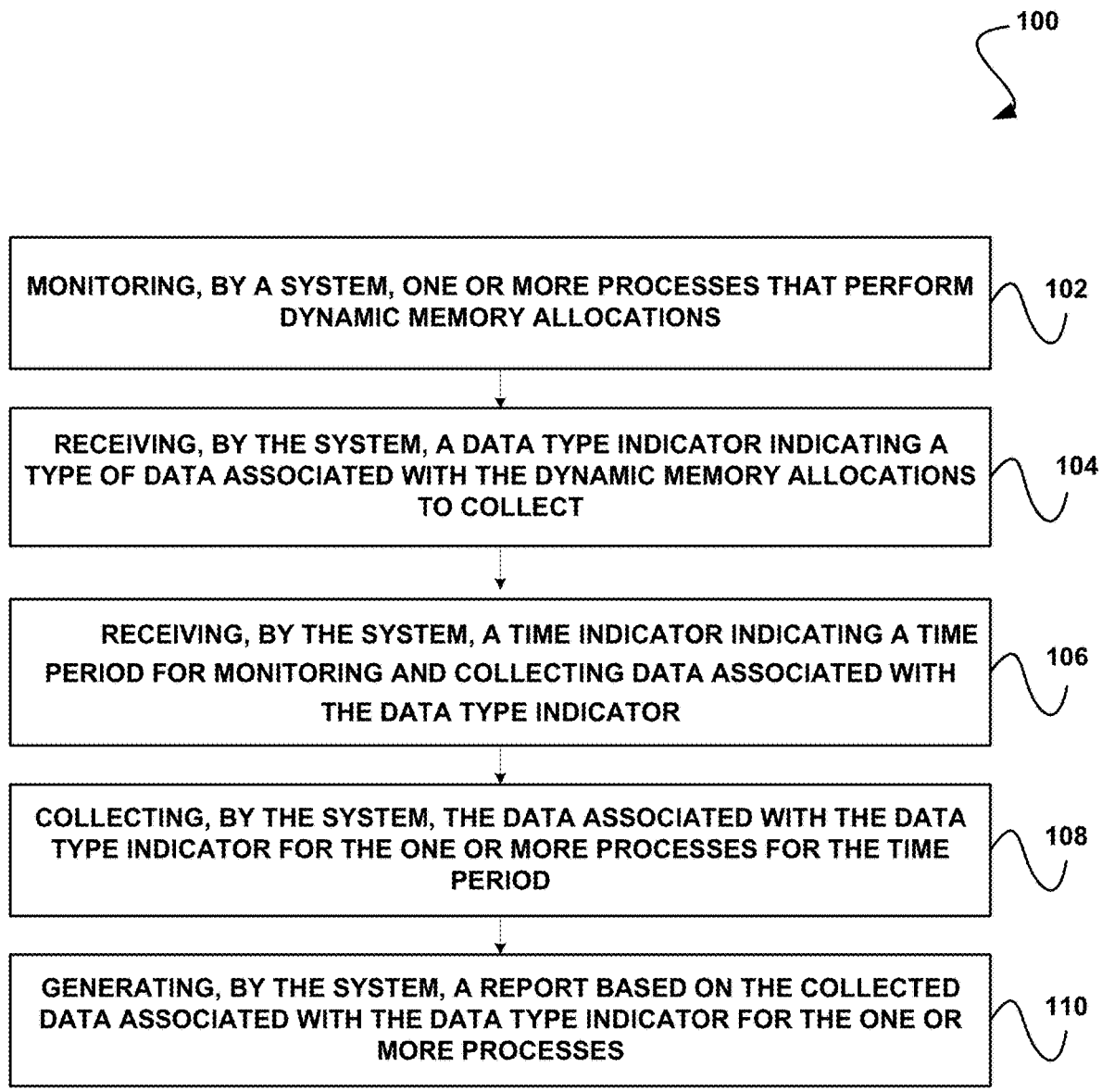
FIG. 1 illustrates a method for periodic memory leak detection, in accordance with one embodiment.

FIG. 1 illustrates a method 100 for periodic memory leak detection, in accordance with one embodiment.

In operation, a system monitors one or more processes that perform dynamic memory allocations. See operation 102. The processes may include any computer process that performs dynamic memory allocations. For example, in one embodiment, the one or more processes may include one or more C or C++ processes, or processes written in any other programming language. The system may receive the indication of the process in various ways, such as in a script identifying the processes or by user input (e.g. via a user interface, etc.) that indicates the processes.

The system receives a data type indicator indicating a type of data associated with the dynamic memory allocations to collect. See operation 104. In one embodiment, the system may receive the data type indicator from a user interface associated with the system. In another embodiment, the system may receive the data type indicator from a command line interface associated with the system. In yet another embodiment, the system may receive the data type indicator from a file, a database or from another media/input associated with the system. In one embodiment, the data type indicator may be received multiple times during the process.

The data type indicator may include any identifier capable of indicating a type of data to be collected. The data to be collected may include any data associated with memory allocations and/or de-allocations. For example, the data type indicator may include an indication to collect data associated with at least one of memory allocations, memory de-allocations, memory allocations and memory de-allocations, or neither memory allocations nor memory de-allocations.

The system also receives a time indicator indicating a time period for monitoring and collecting data associated with the data type indicator. See operation 106. The time indicator may include any identifier capable of indicating a time period for monitoring and collecting data. For example, in one embodiment, the time indicator may include a start time and an end time for monitoring and collecting the data associated with the data type indicator. In another embodiment, the time indicator may include either a start time or an end time for monitoring and collecting the data associated with the data type indicator. In one embodiment, the time indicator may be received multiple times during the process.

In one embodiment, the system may receive the time indicator from a user interface associated with the system. In another embodiment, the system may receive the time indicator from a command line interface associated with the system. In yet another embodiment, the system may receive the time indicator from a file, a database or from another media/input associated with the system.

The system collects the data associated with the data type indicators for the one or more processes for the time periods. See operation 108. Moreover, the system generates reports based on the collected data associated with the data type indicators for the one or more processes. See operation 110.

In one embodiment, the report may be generated at a time based on a user input. For example, the system may receive a time indicator indicating a time for generating a report associated with the collected data. In another embodiment, the report may be generated upon termination of a time period for collecting the data associated with the data type indicator for the one or more processes. In yet another embodiment, the report may be generated upon termination of the one or more processes. The system may receive an indicator to produce a memory leaks report based on the data that was collected by the system up to that point, at any time during the process run-time. The report may indicate memory leaks associated with the one or more processes. In various embodiments, the report may be generated in different formats (e.g. a text file, etc.). In another embodiment, the report may be generated at a time indicated in a file, a database or another media/input associated with the system.

In one embodiment, the system may receive at any time during the process run-time, an indicator to clear all or part of the data that was collected by the system for the process so far. In this case, the system may clear all or part of the data that was collected by the system for the process so far, upon receiving an indicator to clear the collected data.

The receiving of indicators for collecting data for the process may be repeated several times for the same process, in any order, during the process run-time, which means that there may be several different periods during the process run-time, where a different or same type of data may be collected in each period and several reports may be generated by the system for the same process.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
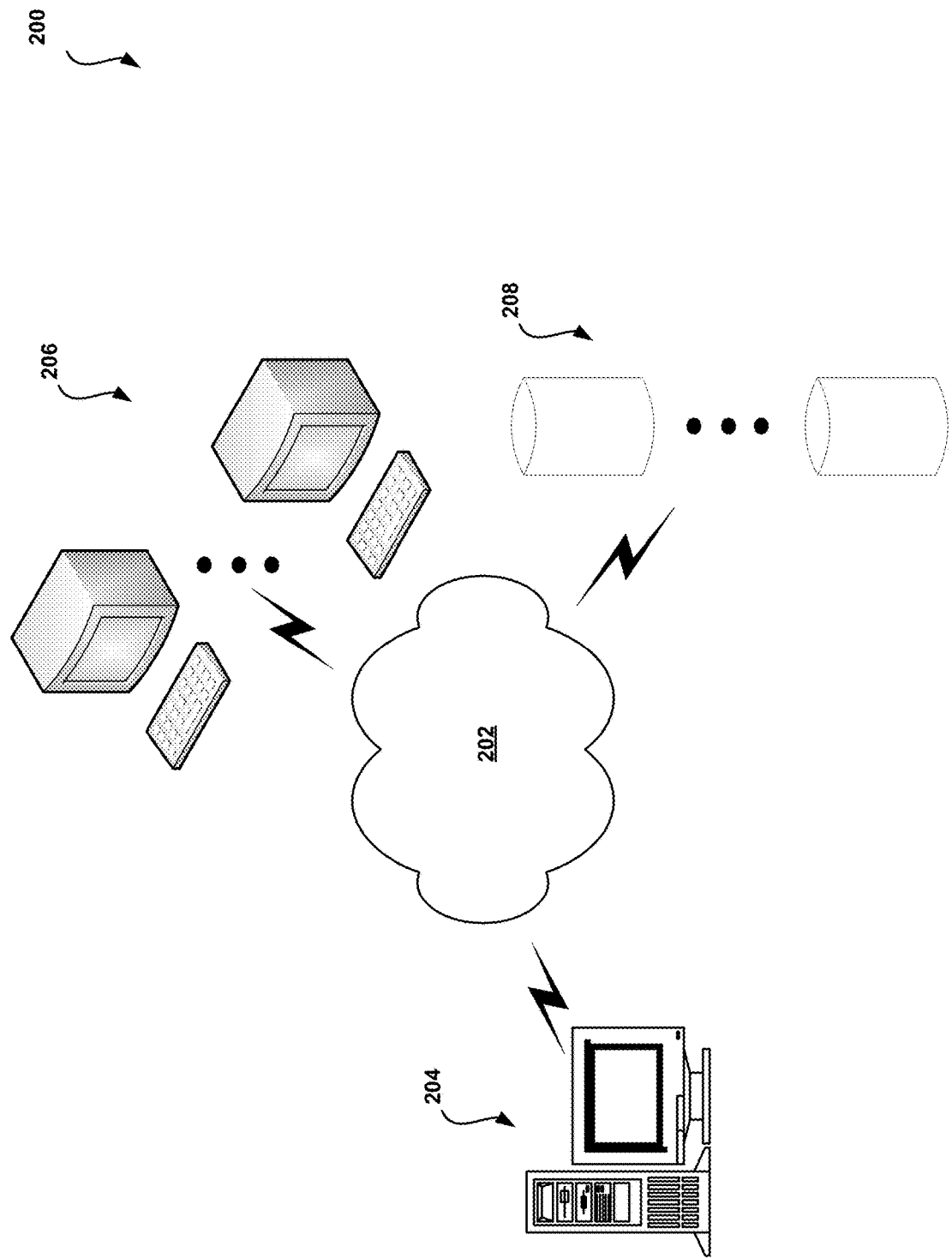
FIG. 2 shows a system for periodic memory leak detection, in accordance with one embodiment.

FIG. 2 shows a system 200 for periodic memory leak detection, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for performing periodic memory leak detection. The system 204 may also implement processes and monitor such processes for periodic memory leak detection. The system 204 may also be in communication with one or more repositories/databases 208.

The system 204 implements a tool (e.g. an application, computer code, etc.) that functions to pinpoint very clearly, efficiently and easily, dynamic memory allocations that were done within a specific user-defined period, and were not released during another subsequent user-defined period, without degrading significantly the performance of the process outside or within those periods, regardless of the process compilation/linking manner and without dependence on the process termination manner.

The system 204 may be useful for processes that allocate memory dynamically, such as C or C++ processes, in production or production-like environments, which must be highly available and/or work at a high-performance level, and/or processes that do not shut down gracefully.

The system 204 may be utilized to avoid collecting and reporting irrelevant memory allocations/de-allocations data, and to avoid degrading the performance of the process when it is not required. The system 204 may also be utilized to produce very short, straight to the point, easy to analyze memory leak reports at a chosen time.

Thus, the system 204 may be utilized to give users the ability to control, during run-time or by preset, the time when to start and stop each monitored period, the type of data that is collected by the system 204 in each monitored period (allocations, de-allocations, both or none), and the time when each leak report is being generated. This choosing ability is essential, since collecting only de-allocations in a period, allows the system 204 to produce short, clean leak reports that contain only allocations that were done in previous period/s, without new allocations.

The system 204 offers a dynamic run-time overloading of memory allocation/de-allocation functions (which means that no special compilation/linking of the process is required). Additionally, the system 204 offers an efficient data collection method that is used by the system 204 within the monitored periods. This makes the system 204 especially useful for production environments.

Memory leaks in performance-critical, highly-available applications in a production or production-like environment, may result in slow response times or in outage of the application, and are notoriously difficult to detect and fix.

In some memory leak scenarios or environments, it is impossible to use any of the existing memory leak detection tools, due to the tool's limitations and/or side-effects, such as: having to change or to recompile the code of the monitored process; significant degradation in the performance of the monitored process; the tool consuming a significant amount of additional memory and/or CPU; the monitored process must not crash, otherwise no leaks report will be produced; the leaks report is produced only when the process shuts down (having to wait until the end of the process); all the memory allocations that were done at the process initialization (which can be a massive amount), are needlessly collected; all the on-going, long-lasting memory allocations that are eventually freed at the process termination, do not appear in the leaks report; having to analyze large leak reports; and/or having to run with a debugger that requires a skilled developer.

Unlike other existing memory leak detection tools, the system 204 can be used in production environments, since it does not have any of the above mentioned limitations or side-effects. The benefits may be gained by allowing a user to control the monitored periods, the type of the data that is collected in each period and the times when the leak reports are generated. In various embodiments, the system 204 may support Linux and HP-UX operating systems, and other operating systems as well.

By allowing the user to choose (e.g. utilizing a user interface associated with the system 204, etc.) the periods of time in which the system 204 collects data for the process and the times when the leak reports are generated, the system 204 does not incur any significant performance overhead to the monitored process at periods when data is not collected for the process. The performance of the monitored process is not degraded significantly (the performance degradation is about 0% in periods when data is not collected and only about 3% in periods when data is collected (which are usually short), where 0% and 3% are an estimation that is based on actual measurements done for one embodiment for a typical process which works at high performance and performs dynamic memory allocations). In another embodiment the performance degradation may be even lower. This means that the system 204 can be used in live production environments, where high-performance is required. Many of the existing tools degrade the performance of the monitored process by hundreds of percent, so it takes several hours just to pass the initialization stage of the process (instead of a few seconds), and this is unacceptable in production.

The system 204 may be utilized to produce short, straight-to-the-point, memory leak reports, which pinpoint clearly only the memory leaks in which a user is interested. Many of the existing tools produce long and very hard to analyze reports, which contain "leaks" that do not need urgent fixing, such as allocations that were done in the process initialization stage.

The system 204 does not consume memory or CPU significantly (i.e. it is light-weight) even in the monitored periods. Many of the existing tools consume a large amount of memory and CPU, in addition to the memory that is consumed by the monitored process. High consumption of memory may lead to the crashing of the monitored process.

High consumption of CPU by one process may affect the performance of other processes negatively on the same machine.

The system 204 can produce several memory leak reports during a single execution of the monitored process, while the process is running, regardless of whether the process crashes or is killed later. Many of the existing tools produce only one leaks report at the process termination, and they may produce it only if the process terminates gracefully.

Utilizing the system 204, no human control may be required at all during the process run. In one embodiment, the system 204 may allow presetting of monitored periods, the type of data to be collected and times of leak reports production before the process is started and/or setting them after the process is started. Additionally, in one embodiment, the system 204 may allow an operator to add monitored periods and produce additional leak reports during the process run time.

In addition to the above mentioned benefits, the system 204 does not require changing or recompiling the code of the monitored process. The code can be compiled with any level of optimization, with or without debug information (in production the code is usually optimized and without debug information).

A typical and simple example of when the system 204 is needed is when there is a process, which must process different transactions, and the process works as follows: at the process initialization stage, many pieces of memory are allocated in different places in the process code; after initialization, billions of different transactions are processed during several days or weeks; and the process either shuts down gracefully or crashes (due to high memory consumption or other reasons). While it is processing the billions of transactions, the memory consumption by the process grows gradually (i.e. leaks), but the process releases this memory when it shuts down gracefully (which means that if the leaks report is produced at the end of the shutdown stage, no leak will be reported in it). If the process crashes or is killed, the leaks report is not generated at all by many of the existing memory leak detection tools.

To make the scenario a little more difficult, as it is often in production, a specific type of transaction that is causing the leak may not be known, and the leak problem may not reproduce in a testing environment (e.g. because the testing simulators that send the transactions to the process in the testing environment are not sending the same transactions as in production).

In this situation, programmers only want to know where exactly in the process' code the system is allocating the memory that is causing the gradual ever-growing memory consumption that occurs while the system is processing transactions. Programmers do not want to analyze the allocations that are performed in the process initialization stage, since there are too many of those and they are often not considered as leaks that need fixing.

One approach to find the source of the gradual memory leak would be to reproduce the same memory leak scenario in a production-like testing environment, in order to use one of the existing memory leak detection tools. Even if the scenario could be reproduced in a production-like testing environment, and assuming that low performance can be tolerated in a testing environment, this approach would consume significant time of developers and hardware. Moreover, this may not provide the desired result, since many of the existing memory leak detection tools do not support the ability to produce a leaks report before the monitored process shuts down and releases all the allocated memory.

The system 204 may detect leaks of memory that were allocated by the process from the heap by using standard allocation and de-allocation functions, such as the C/C++ malloc/new/new[ ]/free/delete/delete[ ] functions.

In one embodiment, the system 204 may include settings that reside in a file, in a database, in a script or in another media/input associated with the system 204, it may include script file/s and/or library file/s, which can be copied to any directory by any user, and can be used by the user directly from where they are located.

In this case, the settings may contain settings of some environment variables that the system 204 can use (e.g. where the values of the variables can be changed by the user, if required). The settings that can be changed may include, for example: a) the location and names of the leaks report files that will be produced; b) the depth of the function-call-stacks that will be printed in the report; c) the signals that will control the behavior of the system 204; d) the stacks to filter out (not to show) in the leak reports; e) definition of time periods for monitoring and the type of data to be collected in those periods; f) times to produce leak reports; and e) various other settings.

In one embodiment, a library file (e.g. a shared library, with ".so" extension, etc.) may include a few functions of the system 204 (e.g. the functions may be very light instrumentations of standard memory allocation and de-allocation functions). In one embodiment, where the system 204 includes a script which sets the values of some environment variables, the script can be executed before starting the monitored process, and then the library file of system 204 may be preloaded automatically by the operating system when the monitored process starts to run, so system 204's functions may be called automatically during runtime instead of the standard dynamic memory allocation and de-allocation functions. For example, in one embodiment which can work on operating systems such as Linux or HP-UX, if prior to starting the monitored process the value of the environment variable LD_PRELOAD was set to contain the path and name of the library which contains the system 204 functions, then as long as the variable value contains the library of system 204, the operating system will load the library automatically when any process will be started. I.e. if the user did setting such as: "export LD_PRELOAD=<the path and name of the library which contains system 204's functions>; <other libraries paths and names>" or activated a script that does this setting, then as long as the variable value contains the library of system 204, the system 204 may monitor any process that will be started.

In one embodiment, a user may utilize a user interface associated with the system 204 to control the period or periods of time when the system 204 monitors the process, the type of data that it collects in each period and the times of the leak reports creation, during runtime (e.g. by simply sending signals to the monitored process from a command line, or by sending commands to a port monitored by the system 204, etc.).

As an example, in one embodiment, where the data type and time indicators are implemented as signals, to send a signal from the command line to the system 204, the following command may be executed: "kill-<signal number> <the monitored process ID>". In this case, the signal number may be one of the following numbers, where any of the signals can be sent several times to the process, in any order, according to the user's needs (e.g. in one embodiment, the signal numbers may be configured differently by the user and may be changed per each monitored process if required, but the signal numbers must be legal signal numbers for the platform, and must not be signals that the monitored process handles by itself): Signal 50—to start collecting data about allocations and de-allocations of memory (it is recommended to send this signal after the process has finished its initialization stage); Signal 53—to stop collecting data about allocations and collect data only about de-allocations of memory; Signal 54—to produce a report of memory leaks, based on the data about allocations and de-allocations that was collected so far; Signal 51—to stop collecting data about allocations and de-allocations; Signal 57—to stop collecting data about de-allocations and collect data only about allocations; Signal 58—to clear all the data that was collected so far in all the periods; Signal 59—to clear all the data that was collected so far in the current period; and various other signals associated with the collected data or reports. It should be noted that this is only one example of implementation and various signals and implementations may be utilized based on desires of the implementer.

In one embodiment, the leak reports may be short text files (if there were not many different memory leaks during the monitored periods). The report may contain function call-stacks where memory was allocated and not released during the monitored periods, in association with the type of data that was collected in those periods and additional information, such as the total number of leaked bytes, the type of the data that was collected in each period of time, the periods of time, time of the report generation, etc. Additionally, per each stack, the number of leaked bytes and the number of calls associated with this stack and additional information may be printed. The stack depth may be controllable by the settings variables of the system 204.

The system 204 may also start/stop collecting data about allocations and de-allocations of memory and print a leaks report automatically, without sending signals or commands by the user during run-time, by presetting/changing the value of all or some of the setting variables of system 204, for example system 204 may use variables such as START_OF_PERIOD_1_COLLECT_ALL=60, START_OF_PERIOD_2_COLLECT_ONLY_DELETE=90, START_OF_PERIOD_3_COLLECT_NONE=370, TIME_1_PRODUCE_REPORT=360. In this example, presetting these variables may define one period that starts 60 seconds after the process starts running and lasts for 30 seconds (until period 2 starts) for collecting allocations and de-allocations, one subsequent period that starts 90 seconds after the process starts and lasts 280 (370–90) seconds for collecting only de-allocations, one subsequent period that starts 370 seconds after the process starts and lasts until the end of the process execution for collecting no data at all and a time for producing a leaks report, which is 360 seconds after the process starts (note that a report may be produced at any time during the process execution). More periods may be defined in the same manner. Additionally, the user may add more monitoring periods during run-time by sending signals or commands to system 204. In one embodiment, the values of the setting variables may be changed also after the process started to run.

Figure 3:
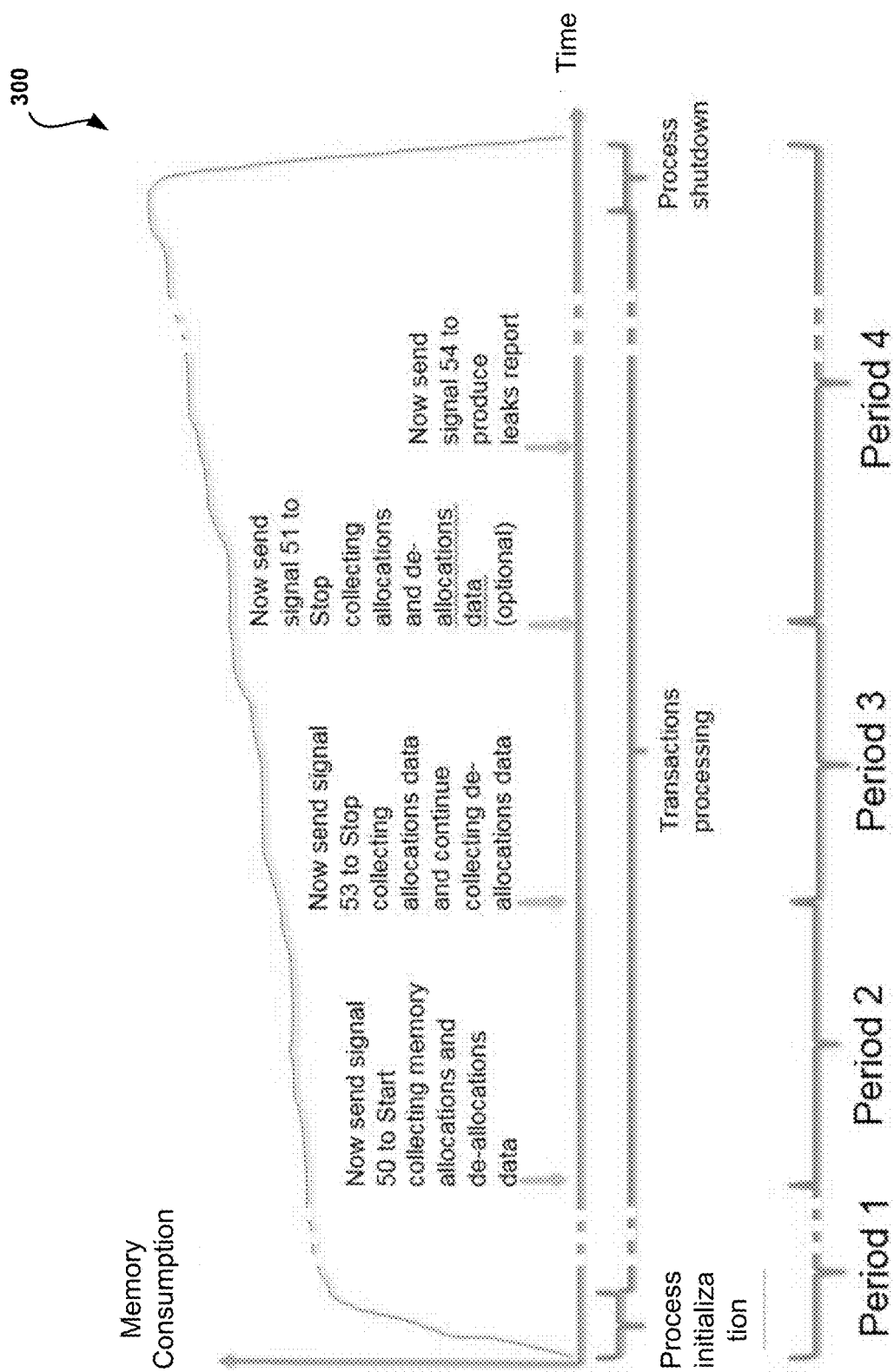
FIG. 3 shows an example illustrating steps to monitor leaks in one period of time, in accordance with one embodiment.

As an example implementation, in order to find the gradually growing memory leak in the example of a high-performance server, the monitored period of time can be short (2-4 minutes), may be while transactions are being processed, and the steps shown in FIG. 3 may be performed.

FIG. 3 shows an example 300 illustrating steps to detect memory leaks in one period of time which starts after the process initialization stage and after some transactions processing, and lasts for a short time, in accordance with one embodiment where the data type and time indicators are implemented as signals. As an option, the example 300 may be implemented in the context of the details of the previous figures and/or any subsequent figure(s). Of course, however, the example 300 may be implemented in the context of any desired environment. Further, the aforementioned definitions may equally apply to the description below.

Before starting the monitored process, a user may enter a Korn-shell by typing: "ksh", and activate a settings script of the system 204 by typing the command: "<the path where the tool is>/<the tool's settings script name>". In this example, "ksh" is needed only because the settings script is assumed to be written in ksh language, but the settings script can be adjusted to any other shell's language. Activating the settings script may also take care of preloading automatically the library which contains the code of the monitoring tool when the monitored process will be started. The monitored process may be then started in the same shell process as the settings script was activated in.

In the example illustrated in FIG. 3, the data type and time indicators are implemented as signals. Each signal that system 204 receives indicates the end of the current period (at the time when the signal is received), the start of a new period (at the same time) and the data type that should be collected in the new period. In the example, the system 204 does not collect any data in period 1 (which includes the process initialization stage and some initial transactions processing). To start the collecting memory allocations and de-allocations data (to start period 2 and end period 1), signal 50 is sent to the monitored process. In period 2 the system 204 keeps collecting the allocations and de-allocations data until the memory consumption grows a little (until the leak occurs at least once after the monitored period started). Then to stop collecting data about allocations and continue collecting data about de-allocations, signal 53 is sent to the monitored process (to start period 3 and stop period 2). In period 3, the system 204 keeps collecting data about any possible de-allocations of memory that are done during transactions processing for 1-2 minutes. To stop collecting any data, a signal 51 may be optionally sent to the monitored process (to start period 4 and stop period 3). This may be needed only if the process has to continue running at very high performance. A signal 54 may be sent to the monitored process to print a memory leaks report, while data is being collected or not collected by system 204. The report will be short if the memory leaks that occurred during the periods in which allocations data was collected were only in a few places in the process code.

The leaks report may then be analyzed. If it is not sufficient, additional data collection periods may be started while transactions are still being processed, by repeating the sending of signals and analyzing the new leaks report. The process can either be shut down or allowed to continue running, regardless of whether it is in a monitored or unmonitored period. If the process shuts down gracefully, an additional leaks report may be produced automatically before the process exits. The resulting leaks report pinpoints clearly the leaks that a user is looking for, since the report contains only allocations that occurred in time periods that were chosen by the user and were not released during time periods that were chosen by the user. The report may be small and very easy to analyze if the periods and the type of data to be collected in those periods were planned wisely.

Figure 4:
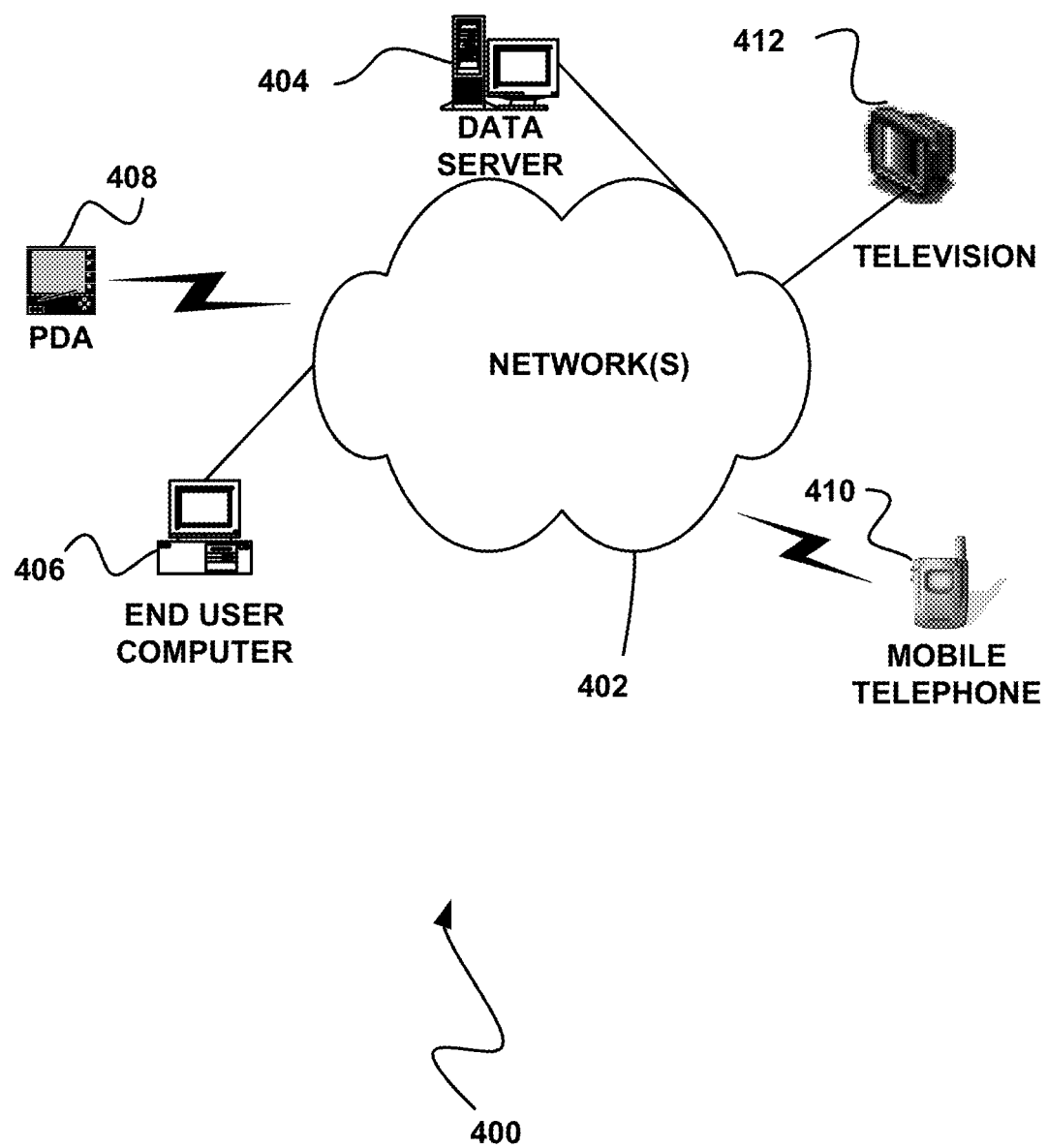
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
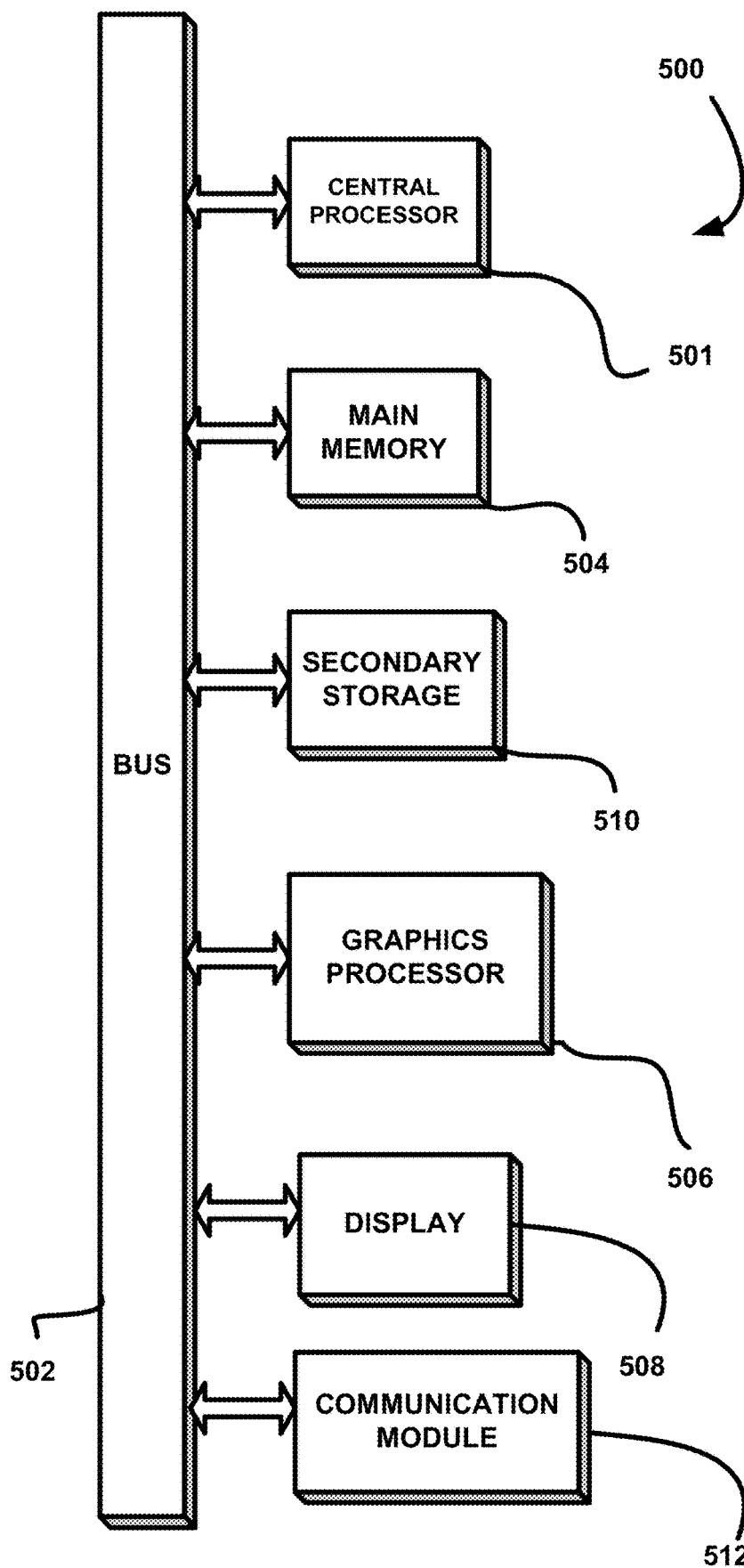
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 505 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a system, a configuration for a monitoring process to be used to monitor, and collect data from, a process that performs dynamic memory allocations, the configuration specifying:
      one or more time periods for monitoring the process, and
      for each time period of the one or more time periods, a data type indicator indicating at least one of memory allocations and memory de-allocations as the data to be collected, and
      a time to generate a report based on the data to be collected;
   performing, by the system, the monitoring process to:
      monitor the process that perform dynamic memory allocations during the one or more time periods, and
      collect the data including the at least one of memory allocations and memory de-allocations indicated for each time period of the one or more time periods, and
      generate the report based on the collected data at the time specified in the configuration, the report specifying memory leaks that include one or more memory allocations that occurred during the one or more time periods and that were not released during the one or more time periods;
   wherein the report includes at least a portion of a function call-stack for each of the one or more memory allocations that occurred during the one or more time periods without being released during the one or more time periods.

2. The method of claim 1, wherein each time period is specified by a start time and an end time.

3. The method of claim 1, wherein the configuration for the monitoring process is defined prior to performing the monitoring process.

4. The method of claim 1, wherein the monitoring process is performed after initialization of the process that performs dynamic memory allocations and during runtime of the process that performs dynamic memory allocations, including generating the report prior to completion of the process that performs dynamic memory allocations.

5. The method of claim 1, wherein the one or more time periods for monitoring the process and the data type indicator for each of the one or more time periods includes:
   a first time period having a first data type indicator indicating that at least memory allocations are to be collected, and
   a second time period having a second data type indicator indicating that only memory de-allocations are to be collected.

6. A computer program product embodied on a non-transitory computer readable medium, comprising computer code for:
   receiving, by a system, a configuration for a monitoring process to be used to monitor, and collect data from, a process that performs dynamic memory allocations, the configuration specifying:
      one or more time periods for monitoring the process, and
      for each time period of the one or more time periods, a data type indicator indicating at least one of memory allocations and memory de-allocations as the data to be collected, and
      a time to generate a report based on the data to be collected;
   performing, by the system, the monitoring process to:
      monitor the process that perform dynamic memory allocations during the one or more time periods, and
      collect the data including the at least one of memory allocations and memory de-allocations indicated for each time period of the one or more time periods, and
      generate the report based on the collected data at the time specified in the configuration, the report specifying memory leaks that include one or more memory allocations that occurred during the one or more time periods and that were not released during the one or more time periods;
   wherein the report includes at least a portion of a function call-stack for each of the one or more memory allocations that occurred during the one or more time periods without being released during the one or more time periods.

7. The computer program product of claim 6, wherein each time period is specified by a start time and an end time.

8. A system, comprising one or more processors, operable for:
   receiving, by the system, a configuration for a monitoring process to be used to monitor, and collect data from, a process that performs dynamic memory allocations, the configuration specifying:
      one or more time periods for monitoring the process, and
      for each time period of the one or more time periods, a data type indicator indicating at least one of memory allocations and memory de-allocations as the data to be collected, and
a time to generate a report based on the data to be collected;
performing, by the system, the monitoring process to:
monitor the process that perform dynamic memory allocations during the one or more time periods, and
collect the data including the at least one of memory allocations and memory de-allocations indicated for each time period of the one or more time periods, and
generate the report based on the collected data at the time specified in the configuration, the report specifying memory leaks that include one or more memory allocations that occurred during the one or more time periods and that were not released during the one or more time periods;
wherein the one or more time periods for monitoring the process and the data type indicator for each of the one or more time periods includes:
a first time period having a first data type indicator indicating that at least memory allocations are to be collected, and
a second time period having a second data type indicator indicating that only memory de-allocations are to be collected.

9. The system of claim 8, wherein each time period is specified by a start time and an end time.

* * * * *